United States Patent [19]

Kurokawa et al.

[11] Patent Number: 5,056,472
[45] Date of Patent: Oct. 15, 1991

[54] 4-CYCLE 12-CYLINDER ENGINE

[75] Inventors: Toshikazu Kurokawa; Hiroshi Sumimoto; Takashiga Tokushima; Tadao Suemori, all of Hiroshima, Japan

[73] Assignee: Mazda Motor Corporation, Hiroshima, Japan

[21] Appl. No.: 532,632

[22] Filed: Jun. 4, 1990

[30] Foreign Application Priority Data

Jun. 6, 1989 [JP] Japan .................................. 1-143392
Jun. 6, 1989 [JP] Japan .................................. 1-143393

[51] Int. Cl.⁵ .............................................. F02M 35/10
[52] U.S. Cl. ............................. 123/52 MV; 123/55 V
[58] Field of Search ............. 123/55 VE, 55 V, 52 M, 123/52 MV, 52 MB, 52 MC

[56] References Cited

U.S. PATENT DOCUMENTS

| | | | |
|---|---|---|---|
| 2,034,368 | 3/1936 | Barkeij. | |
| 2,098,718 | 11/1937 | Caminez et al. | 123/55 V |
| 2,113,077 | 4/1938 | Buchi | 123/55 V |
| 2,429,105 | 10/1947 | Paxman | 123/55 V |
| 3,796,048 | 3/1974 | Annus et al. | 123/52 M |
| 3,845,746 | 11/1974 | Elsbett | 123/52 MB |
| 4,300,488 | 11/1981 | Cser | 123/52 MB |
| 4,615,324 | 10/1986 | Choushi et al. | 123/52 MV |
| 4,622,926 | 11/1986 | Rutschmann et al. | 123/52 MB |
| 4,760,819 | 8/1988 | Vorum | 123/52 MB |
| 4,829,941 | 5/1989 | Hitomi et al. | 123/52 MV |
| 4,938,177 | 7/1990 | Hasegawa | 123/52 MV |

FOREIGN PATENT DOCUMENTS 0158008 10/1985 European Pat. Off. .
369784 3/1932 United Kingdom .

Primary Examiner—David A. Okonsky
Attorney, Agent, or Firm—Fleit, Jacobson, Cohn, Price, Holman & Stern

[57] ABSTRACT

A four cycle, 12-cylinder engine includes four cylinder groups each having three cylinders located adjacent to each other. The cylinders in each cylinder group have intake strokes which are apart one from another by 240° in terms of angle of rotation of the engine crankshaft. The cylinders in each cylinder group are connected through respective branch intake passages with a common intake passage. Means is provided for separating the common intake passage of one cylinder group from the common intake passage of another cylinder group.

10 Claims, 8 Drawing Sheets

4-CYCLE 12-CYLINDER ENGINE

BACKGROUND OF THE INVENTION

1. Field of the Invention

The present invention relates to a four cycle, 12-cylinder engine having an intake system adapted for "intake resonant supercharging".

2. Description of the Prior Art

In the intake system of an internal combustion engine, it has been recognized that pulsation of the intake air is produced in the intake passage in response to the operation of the intake valve. The pulsation is considered to have a natural frequency which is determined by various factors such as the length of the intake passage between the intake valve and the open end to the atmosphere, and the sectional configuration of the intake passage.

Various efforts have been made in the past to utilize this phenomenon in obtaining a supercharging effect. This can be done by designing the intake passage such that the natural frequency of the pulsation is matched with the operating frequency of the intake valve so that positive pressure prevails around the intake port in the intake stroke under an engine speed in which a high engine output is desired. The positive pressure around the intake port is effective to increase the intake charge to thereby provide an increased volumetric efficiency. The supercharging of this type may be called "intake resonant supercharging" because it utilizes intake air resonance in the intake passage.

In applying the principle of intake resonant supercharging to a multiple cylinder engine, it has been proposed to divide the cylinders of the engine into a plurality of groups. In grouping the cylinders, the sequence of the intake strokes is taken into account such that in terms of the sequence of the intake strokes the cylinders in one group are not adjacent to each other. In other words, grouping is made such that between the intake strokes of two cylinders in one group there occurs an intake stroke in another cylinder group. The intake ports of the cylinders in one group are connected through branch intake passages with a common intake passage which may constitute a surge tank. The common intake passage for one cylinder group is usually separated from the common intake passage for other cylinder groups so that the branch intake passages and the common intake passage of each cylinder group provide a length of the intake passage for the intake air resonance. A shut-off valve may be provided between the common intake passages of the plurality of cylinder groups so that the common intake passages may be communicated with each other when desired to provide another length of the intake passage for the intake air resonance. With this arrangement, the intake resonant supercharging effect can be obtained under a plurality of engine speeds. An example of this arrangement is disclosed by the U.S. Pat. No. 4,829,941 issued to M. Hitomi et. al.

Recent trends in automobile engine design are to provide an increased number of cylinders so that engine output torque fluctuation can be minimized. It is predicted that new 12-cylinder engines will be developed for high class passenger cars. In designing such 12 cylinder engines, it is also desirable to apply the aforementioned intake resonant supercharging principle. However, such supercharging system generally has complicated and bulky intake passages so that it is not easy to apply the intake supercharging to a 12-cylinder engine.

SUMMARY OF THE INVENTION

It is therefore the object of the present invention to provide a 12-cylinder engine having an air intake system adapted for intake resonant supercharging which is compact in size.

In accordance with the present invention, there is provided a four cycle, 12-cylinder engine which includes four cylinder groups each having three cylinders located adjacent to each other. The cylinders in each cylinder group have intake strokes which are apart one from another by 240° in terms of angle of rotation of the engine crankshaft. The cylinders in each cylinder group are connected through respective branch intake passages with a common intake passage. Means is provided for separating the common intake passage of one cylinder group from the common intake passage of another cylinder group.

According to the features of the present invention, intake resonant supercharging effect can be obtained in each cylinder group and the air intake system can be made compact since the cylinders in each cylinder group have intake strokes which are apart one from another by 240° and the cylinders in each cylinder group are connected through respective branch intake passages with a common intake passage.

In a preferable aspect of the present invention, a four cycle, 12-cylinder engine includes six cylinders arranged in a first row and six cylinders arranged in a second row. The cylinders of the first row and the cylinders of the second row have a common crankshaft to provide a V-shaped cylinder arrangement. A first cylinder group comprises three cylinders from one end of the first row, and a second cylinder group comprises remaining three cylinders in the first row. A third cylinder group comprises three cylinders from one end of the second row, and a fourth cylinder group comprises the remaining three cylinders in the second row. The cylinders in each group have intake stroke timings of 240° spacing in terms of angle of rotation of the crankshaft. A first common intake passage means is connected through first branch intake passages with respective ones of the cylinders in the first group, and a second common intake passage means is connected through second branch intake passages with respective ones of the cylinders in the second group. A third common intake passage means is connected through third branch intake passages with respective ones of the cylinders in the third group, and a fourth common intake passage means is connected through fourth branch intake passages with respective ones of the cylinders in the fourth group. The first and second common intake passage means are located above the cylinders in the first row, and the third and fourth common intake passage means are located above the cylinders in the second row.

Alternatively, the first and second common intake passage means can be located above the cylinders in the second row, and the third and fourth common intake passage means can be located above the cylinders in the first row, or all common intake passages can be located above the cylinders in one of the two rows.

According to the above features, in a V-type 12-cylinder engine, intake resonant supercharging effect can be obtained in each cylinder group and the air intake system can be made compact since the cylinders in each cylinder group have intake strokes which are apart one from another by 240° and the cylinders in each cylinder group are connected through respective branch intake passages with a common intake passage located above the cylinder row.

In another preferable aspect of the present invention, the first and second common intake passage means are longitudinally aligned and a first communicating passage means is provided between the first and second common intake passage means for communicating the first and second common intake passages means with each other. A first shut-off valve means is provided in the first communicating passage means. The above arrangement is also applied to the third and fourth common intake passage means.

According to the above features, the intake resonant supercharging effect can be obtained under a plurality of engine speeds and the air intake system can be made more compact since two common intake passage means are longitudinally aligned and communicated with each other through a communicating passage means having a shut-off valve means.

In another preferable aspect of the present invention, said common intake passages constitute surge tanks.

The above and other objects and features of the present invention will be apparent from the following descriptions of preferred embodiments made with reference to the accompanying drawings.

DESCRIPTION OF THE PREFERRED EMBODIMENTS

Figure 1:
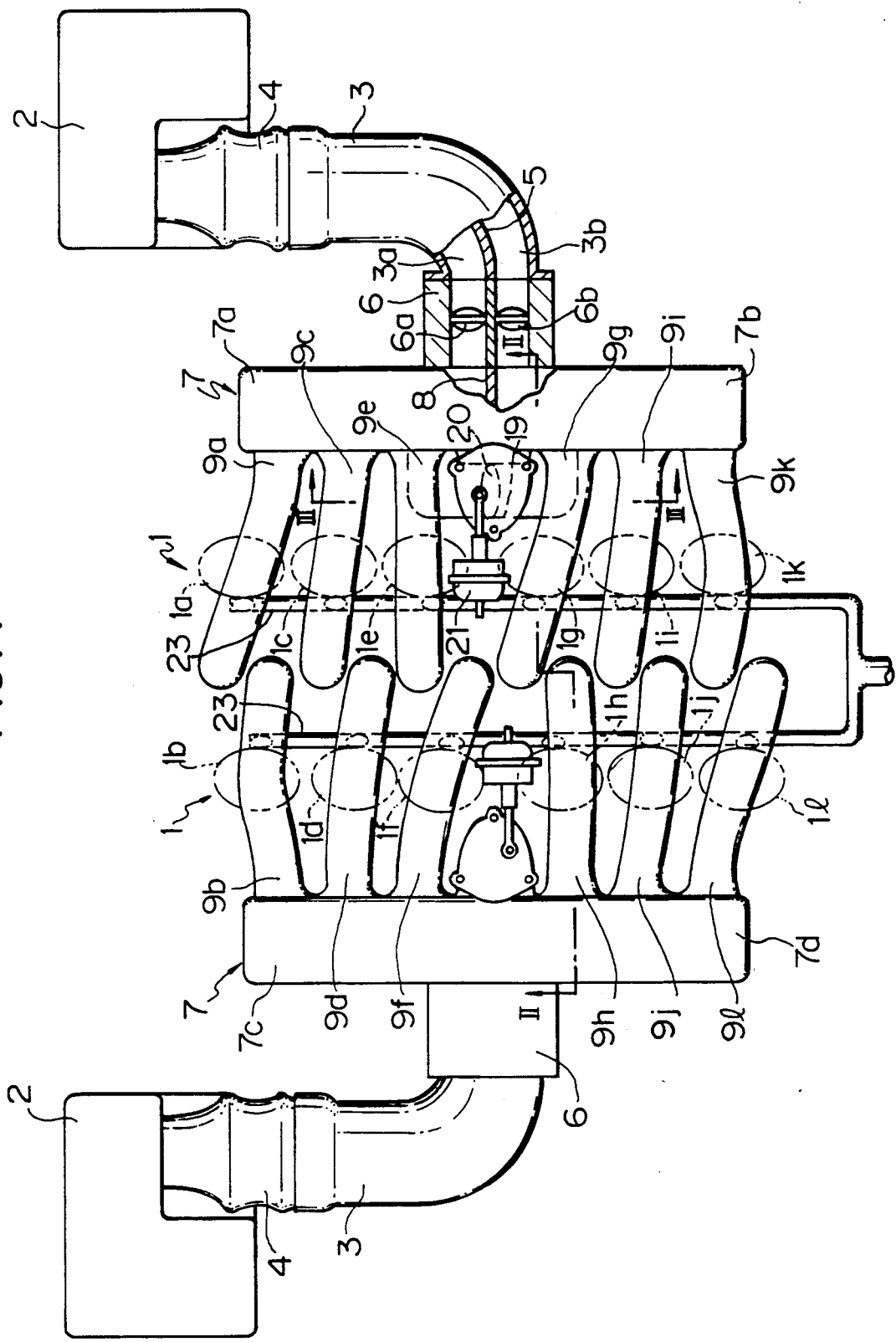
FIG. 1 is a plan view showing the intake system in accordance with a first embodiment of the present invention.
Figure 2:
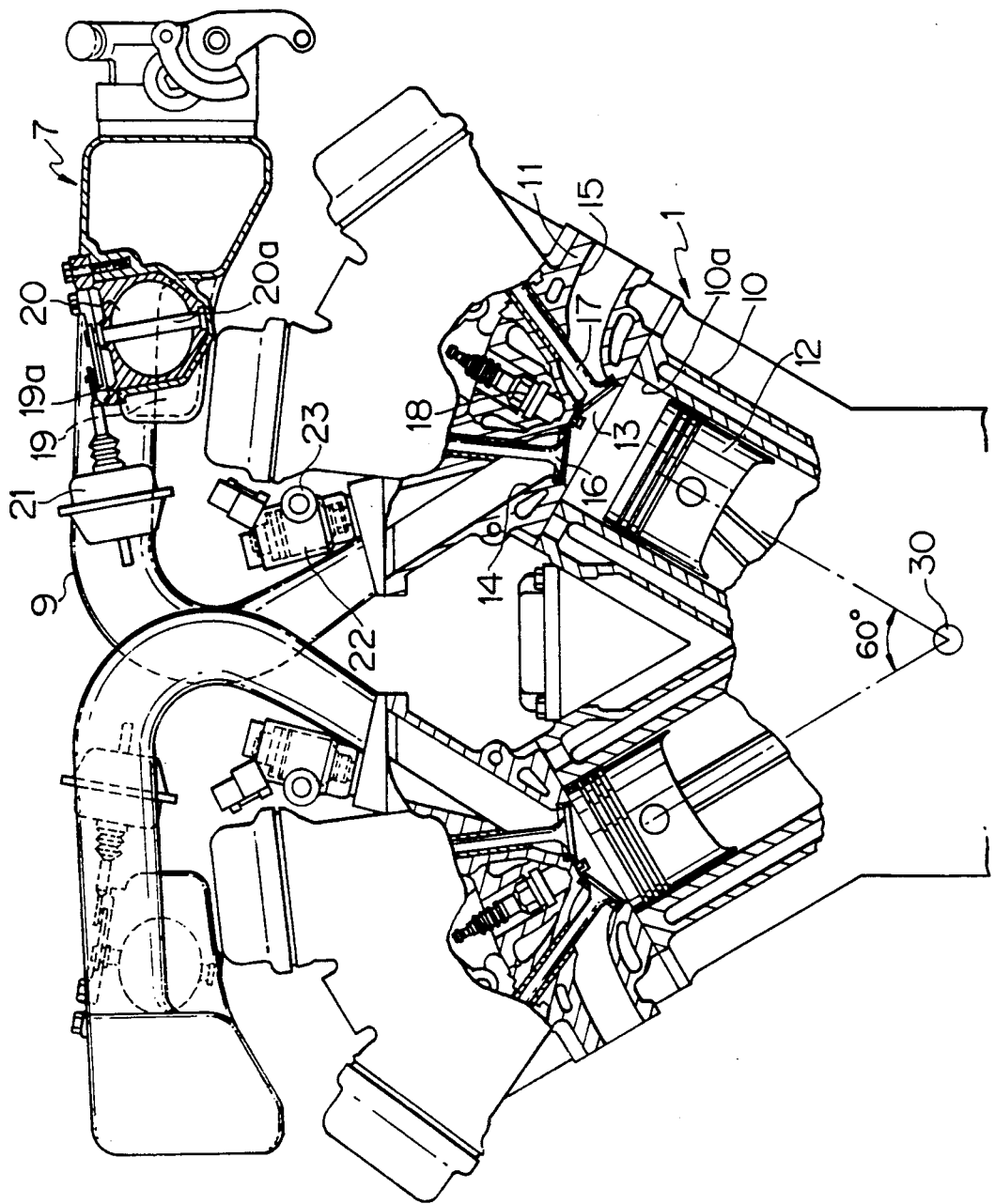
FIG. 2 is a sectional view taken along the line II—II in FIG. 1.

Referring to FIGS. 1 and 2, there is shown a V-12 four-cycle engine having an intake system in accordance with an embodiment of the present invention. In FIG. 1, twelve cylinders 1 are disposed in two rows having six cylinders each. As shown in FIG. 2, the two rows of cylinders 1 have a common crankshaft 30 to provide a V configuration with a crossing angle of 60°. For distinguishing the cylinders, the uppermost cylinder in the right row in FIG. 1 is denoted by 1a, and the uppermost cylinder in the left row is denoted by 1b, and, in the same manner, the other cylinders are denoted by 1c, 1d, 1e, 1f, 1g, 1h, 1i, 1j, 1k, 1l. These cylinders will be referred to as cylinder no. 1 to cylinder no. 12 in the order mentioned. The firing order is 1-12-9-4-5-8-11-2-3-10-7-6. By the adoption of the above firing order, when the cylinders 1 of each row are divided into two groups each comprising three adjacent cylinders, the firing interval between the three cylinders in each group becomes 240° in terms of angle of rotation of the crank shaft. That is, the firing interval between the cylinders 1a, 1c, 1e which are in one and the same cylinder group is 240°. The same relationship holds for the group comprising the cylinders 1b, 1d, 1f, the group comprising the cylinders 1g, 1i, 1k, and the group comprising the cylinders 1h, 1j, 1l.

The intake system independently provided for each cylinder row has an intake pipe 3 connected to an air cleaner 2 at one end through an air flow meter 4.

Hereinafter the description of this embodiment is set out with respect to the right cylinder row in FIG. 1.

Referring to the right cylinder row in FIG. 1, the intake pipe 3 is divided at a downstream portion thereof into two intake pipe portions 3a, 3b by a partition 5. The downstream end of the intake pipe 3 is connected to a throttle body 6 having throttle valves 6a, 6b. The intake pipe portion 3a is connected to a passage in the throttle body 6 which has the throttle valve 6a, while the intake pipe portion 3b is connected to a passage in the throttle body 6 which has the throttle valve 6b.

As shown in FIG. 2, a surge tank 7 is provided above the cylinder row as a common intake passage. The surge tank 7 comprises tank portion 7a for the group comprising the cylinders 1a, 1c, 1e and tank portion 7b for the group comprising the cylinders 1g, 1i, 1k. These tank portions 7a, 7b are, as shown in FIG. 1, longitudinally aligned along the cylinder row. The tank portions 7a, 7b are separated from each other by a partition 8. The tank portions 7a, 7b are communicated with the passages in the throttle body 6 which have the throttle valve 6a, 6b, respectively.

Three branch intake passages 9a, 9c, 9e are connected to the tank portion 7a, and three branch intake passages 9g, 9i, 9k are connected to the tank portion 7b. In FIG. 2, these branch intake passages are represented by reference numeral 9. Referring to FIG. 2, the cylinders 1 comprise a cylinder block 10 and a cylinder head 11 provided on the cylinder block 10. A cylinder bore 10a is formed in the cylinder block 10 for each cylinder. A piston 12 is slidably disposed in the cylinder bore 10a.

For each cylinder, the cylinder head 11 has a combustion chamber 13, an intake port 14 and an exhaust port 15, which communicate with the combustion chamber 13. The intake port 14 is provided with an intake valve 16 for opening and closing the intake port 14. Similarly, the exhaust port 15 is provided with an exhaust valve 17 for opening and closing the exhaust port 15. The intake valve 16 and exhaust valve 17 are operated by a valve train disposed above the cylinder head 11. An ignition plug 18 is installed in the cylinder head 11.

As shown in FIGS. 1 and 2, the branch intake passages 9 extend from the surge tank 7 and transversely to the cylinder row and toward a space between the two cylinder rows, and bend downward midway between the two cylinder rows. Then the branch intake passages 9 extend slantedly and downward, and are connected to the intake ports 14 formed in the cylinder head 11.

Figure 3:
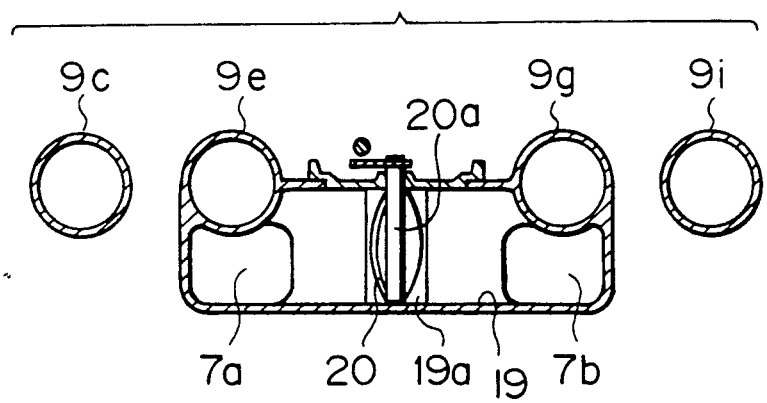
FIG. 3 is a sectional view taken along the line III—III in FIG. 1.

As shown in FIG. 1, the tank portions 7a, 7b constituting the surge tank 7 are interconnected by a communicating passage 19. As shown in FIGS. 1 to 3, the communicating passage 19 is disposed below the branch intake passages 9e, 9g and communicates with the surge tank portion 7a below the branch intake passage 9e at one end and with the surge tank portion 7b below the branch intake passage 9g at the other end. The communicating passage 19 is provided with a valve housing 19a at its mid-portion, and an shut-off valve 20 is disposed in the valve housing 19a. As shown in FIG. 3, the communicating passage 19 is defined using the space below the branch intake passages 9e, 9g. The shut-off valve 20 is fixedly connected to a rotatable vertical shaft 20a. The shut-off valve 20 is operated by an actuator 21 which is controlled, for example, in accordance with the engine speed, whereby the shut-off valve 20 opens when the engine speed exceeds a predetermined value.

As shown in FIG. 2, the branch intake passages 9 are provided at the downstream end thereof with a fuel injection valve 22 which supplies fuel to the intake port 14 to which the branch intake passages 9 are connected. As shown in FIG. 1, a fuel feeding pipe 23 is disposed along the cylinder row. Fuel is fed to each fuel injection valve 22 through the pipe 23.

The air intake system for the left cylinder row in FIG. 1 has the same arrangement as that of the right cylinder row described above. The two tank portions constituting the surge tank 7 for the left cylinder row are denoted by 7c, 7d respectively. The branch intake passages are denoted by the same suffixes as those of the corresponding cylinders.

Figure 4:
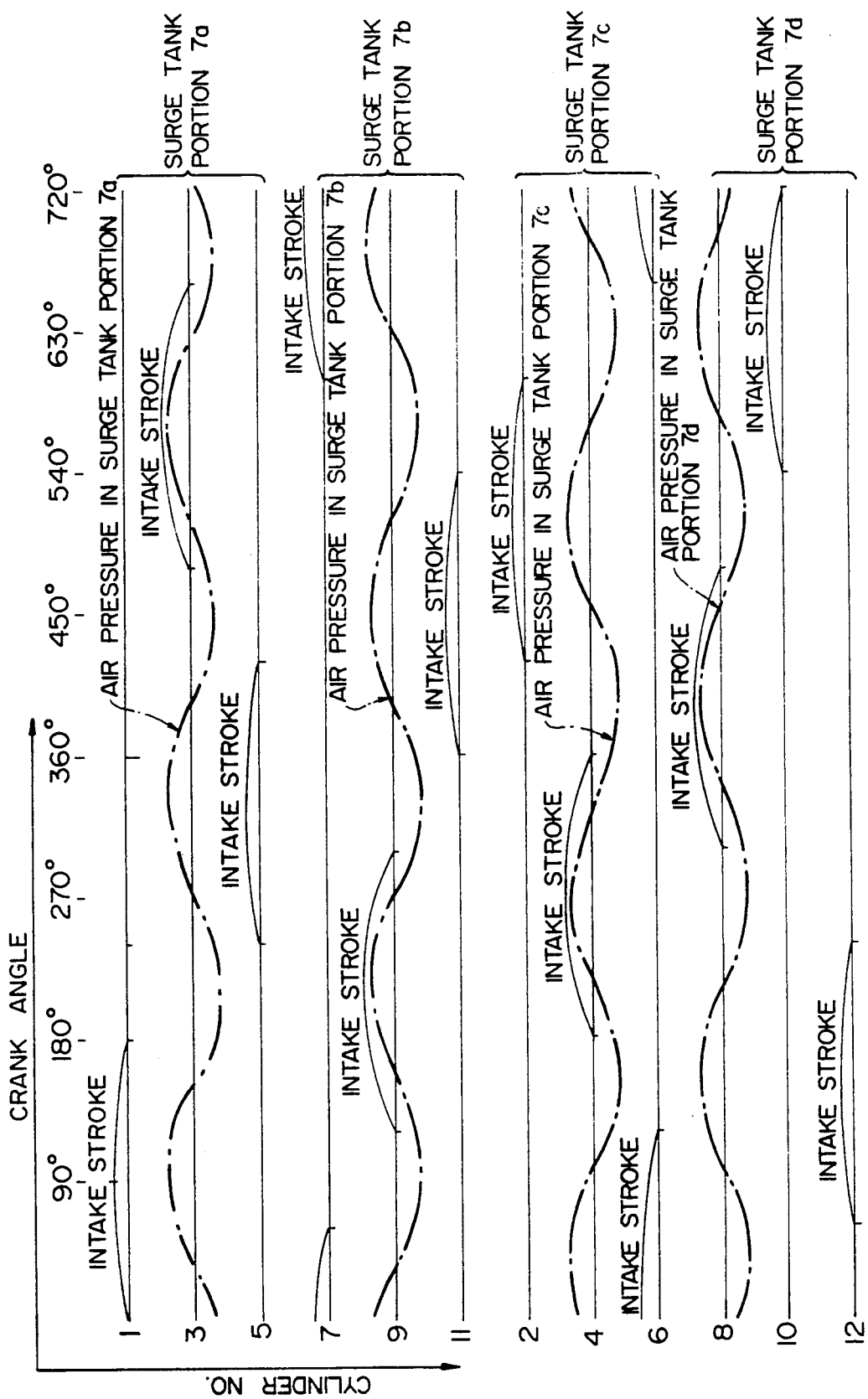
FIG. 4 is a diagram showing the pressure patterns of the pulsation of the intake air in the surge tanks in FIG. 1.
Figure 5:
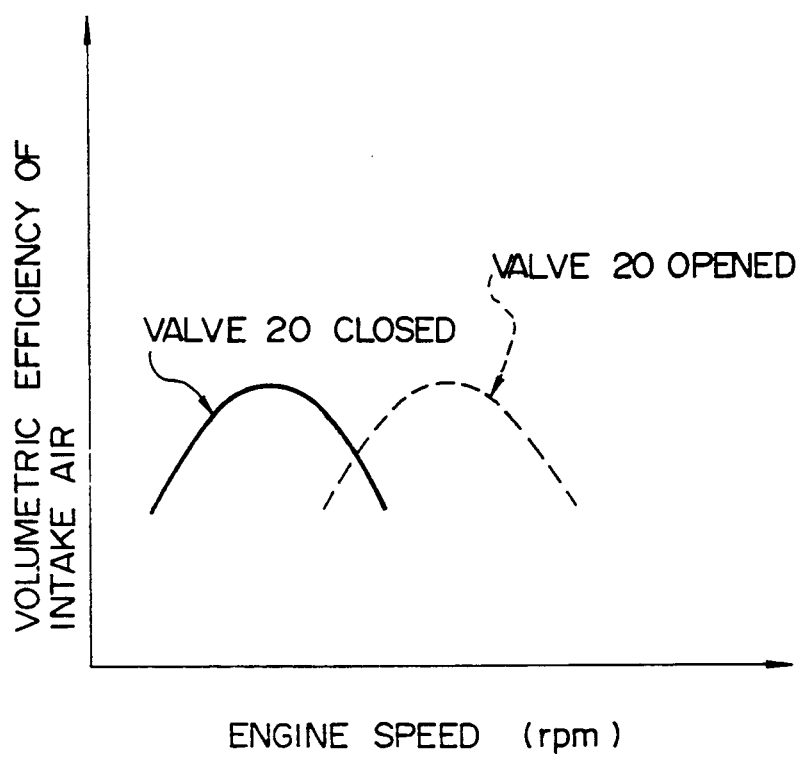
FIG. 5 is a graph showing the relation between the volumetric efficiency of the intake air and the engine speed in the intake system in FIG. 1.

In the air intake system of this embodiment, the tank portions 7a, 7b constitute common air intake passages for the respective cylinder groups. Intake resonant supercharging can be obtained in a predetermined low engine speed region with the valve 20 being closed by appropriately determining the sectional configurations of the tank portions 7a, 7b and the position of the confluence point of the intake pipe portions 3a, 3b. That is, since the firing order is 1-12-9-4-5-8-11-2-3-10-7-6, the pulsation of the intake air in the tank portion 7a is opposite in phase to that in the tank 7b, as shown in FIG. 4. These two opposite phase pulsations of the intake air overlap at the confluence point of the intake pipe portions 3a, 3b communicating with the tanks 7a, 7b respectively, thereby making the air pressure at the confluence point constant so as to make the confluence point function as an open end to the atmosphere. Thus intake resonant supercharging is obtained in a predetermined low engine speed region by the pulsation of the intake air with a relatively low natural frequency in a relatively long intake passage having an open end to the atmosphere at the confluence point of the intake pipe portions 3a, 3b. At this time, as shown in FIG. 4, the interval of the intake strokes between the three cylinders in each cylinder group becomes 240° since the firing interval between the three cylinders in each cylinder group is set at 240°. Thus the interference between the intake air of the cylinders in one and the same cylinder group is prevented. When the shut-off valve 20 is opened, the tank portions 7a, 7b are mutually communicated, and as a result, the portion of the communicating passage 19 wherein the shut-off valve 20 is located and wherein the opposite phase pulsations in the tank portions 7a, 7b overlap comes to function as an open end to the atmosphere. As a result, the length of the intake passage between the intake valve of the cylinder and the open end to the atmosphere is reduced and the natural frequency of the pulsation of the intake air is increased. Thus intake resonant supercharging is obtained in a predetermined high engine speed region. As a result, the volumetric efficiency of the intake air has a maximum value in each of a low engine speed region in which the shut-off valve 20 is closed and a high engine speed region in which the shut-off valve 20 is opened, as shown in FIG. 5. Thus intake resonant supercharging is obtained in a pulrality of engine speed regions.

As described above, the surge tanks 7 are disposed above the cylinder rows and the branch intake passages 9 are so arranged as to extend transversely to the cylinder rows and toward the space between the two cylinder rows and bend downward so as to be connected to the intake ports in the cylinders 1. Thus a compact arrangement of the intake system is achieved. The communicating passages 19 between the surge tank portions for achieving the intake resonant surpercharging in a plurality of engine speed regions are defined using the space below the branch intake passages 9. Thus a very compact arrangement of the intake system is achieved.

Figure 6:
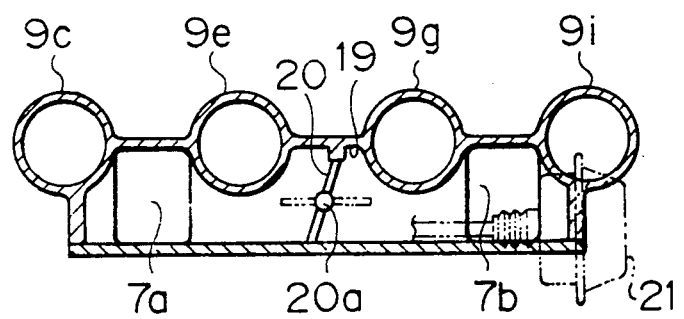
FIG. 6 is a sectional view similar to FIG. 3 in the first embodiment.

Referring to FIG. 6, there is shown a second embodiment of the present invention. In FIG. 6, the elements corresponding to those of the first embodiment are denoted by the same reference numerals as in the first embodiment. In this embodiment, the communicating passage 19 is disposed below the branch intake passages 9c, 9e, 9g, 9i and is communicated with the surge tank portion 7a below the midway portion between the branch intake passages 9c and 9e at one end and to the surge tank portion 7b below the midway portion between the branch intake passages 9g and 9i at the other end. The communicating passage 19 is provided with the shut-off valve 20 at its midportion. The shut-off valve 20 is fixedly connected to a rotatable horizontal shaft 20a. The shut-off valve 20 is operated by an actuator 21. The constitution of the intake system in this embodiment is the same as that in the first embodiment except for the above points.

Figure 7:
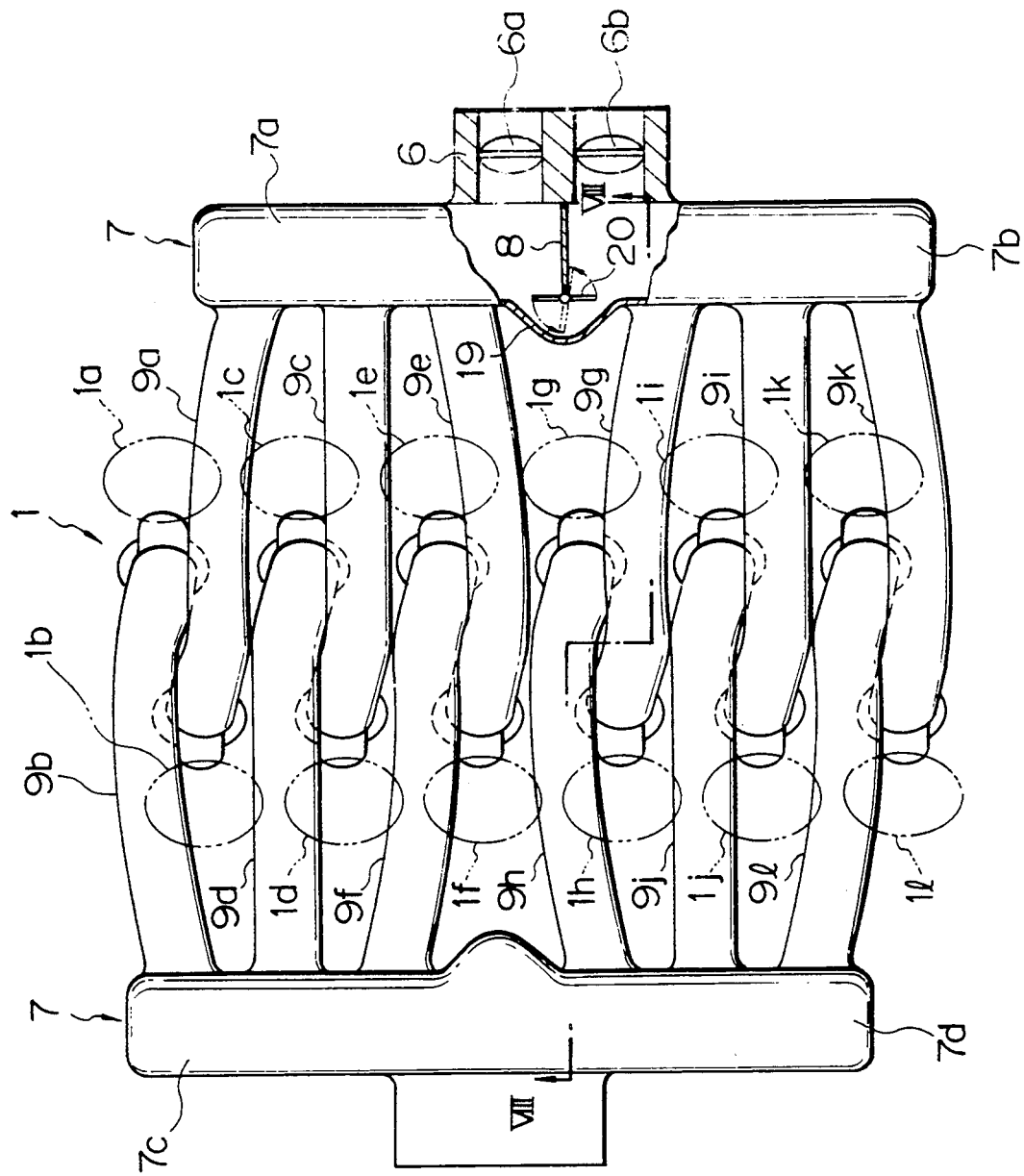
FIG. 7 is a plan view showing the intake system in accordance with a third embodiment of the present invention.
Figure 8:
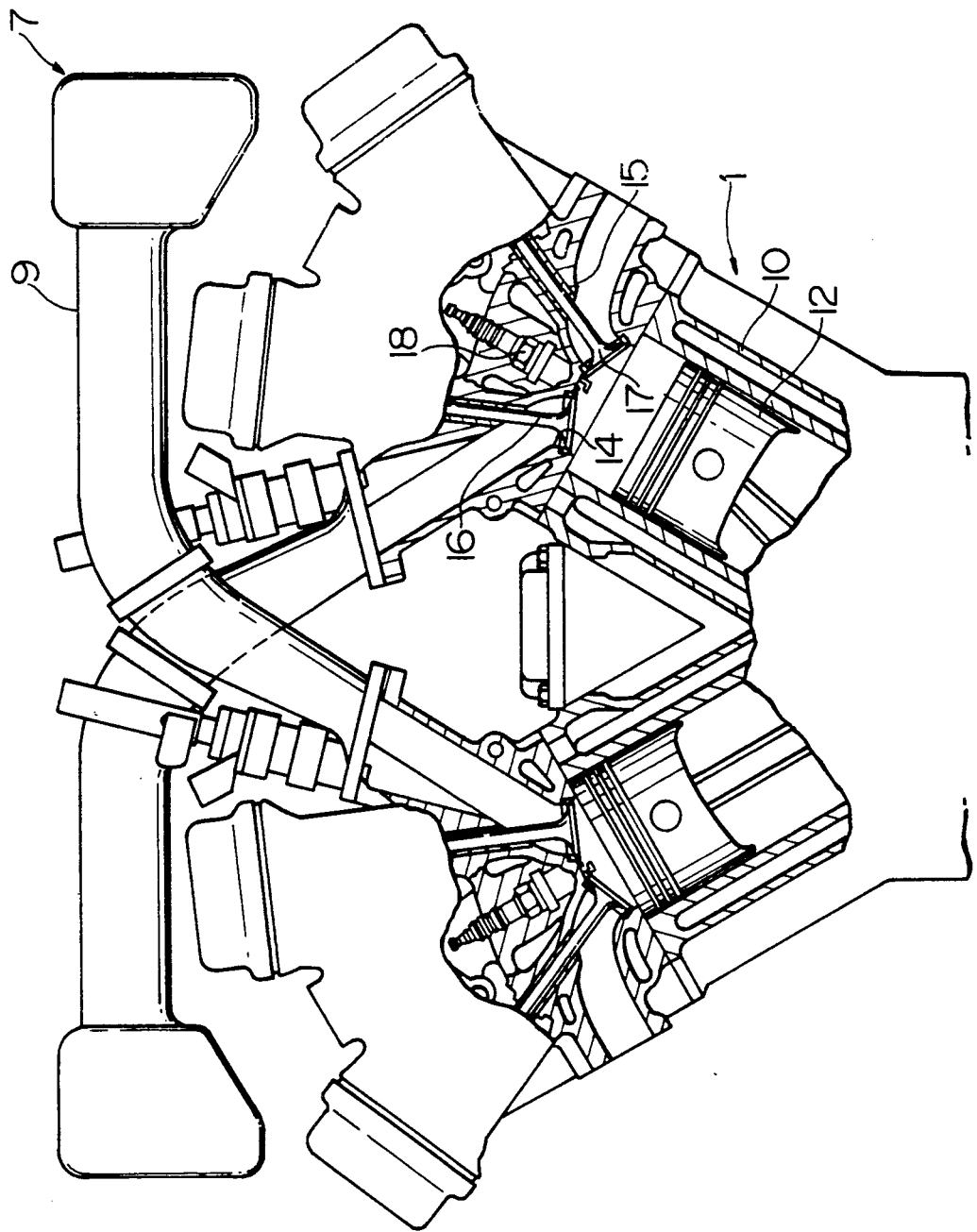
FIG. 8 is a sectional view taken along the line VIII—VIII in FIG. 7.

Referring to FIGS. 7 and 8, there is shown a third embodiment of the present invention. In FIGS. 7 and 8, the elements corresponding to those of the first embodiment are denoted by the same reference numerals as in the the first embodiment. As shown in FIG. 8, the branch intake passages 9 extend transversely to the cylinder rows and toward a space between the two cylinder rows, and bend downward and slantedly, and are connected to the intake ports 14 of the cylinders in the opposite side cylinder row. The surge tank 7 is divided into the tank portions 7a, 7b or the tank portions 7c, 7d by the partition 8. The surge tank 7 is provided with a transversely swelled portion 19 near the partition 8, which defines the communicating passage. The shut-off valve 20 is installed in the swelled portion 19. Other structures are the same as in the first embodiment.

Figure 9:
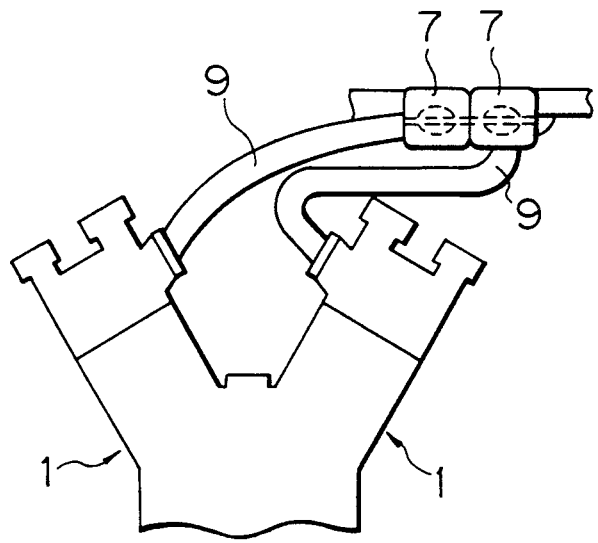
FIG. 9 is a front view showing the intake system in accordance with a fourth embodiment of the present invention.
Figure 10:
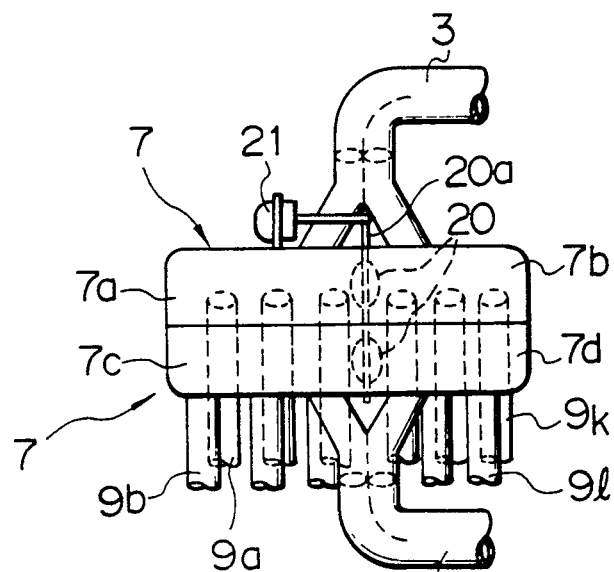
FIG. 10 is a plan view showing the intake system in accordance with a fourth embodiment of the present invention.

Referring to FIGS. 9 and 10, there is shown a fourth embodiment of this invention. In FIGS. 9 and 10, the elements corresponding to those of the first embodiment are denoted by the same reference numerals as in the the first embodiment. In this embodiment, the surge tanks 7, 7 for the cylinder rows in a V configuration are disposed adjacent to each other above one and the same cylinder row. Similar to the above embodiments, the surge tanks 7 are divided into tank portions 7a, 7b and tank portions 7c, 7d respectively and the shut-off valves 20 are disposed between tank portions 7a and 7b, and between tank portions 7c and 7d respectively. As shown in FIG. 10, the two shut-off valves 20 are disposed adjacent to each other and connected to a common rotatable horizontal shaft 20a. The rotatable horizontal shaft 20a is driven to rotate by the actuator 21 so as to achieve the communication and the shutoff between the tank portions 7a and 7b and between the tank portions 7c and 7d. The advantage of the constitution of this embodiment lies not only in the fact that only one actuator is necessary but also in the fact that the time lag between the operations of the two shut-off valves 20 can be reduced.

Figure 11:
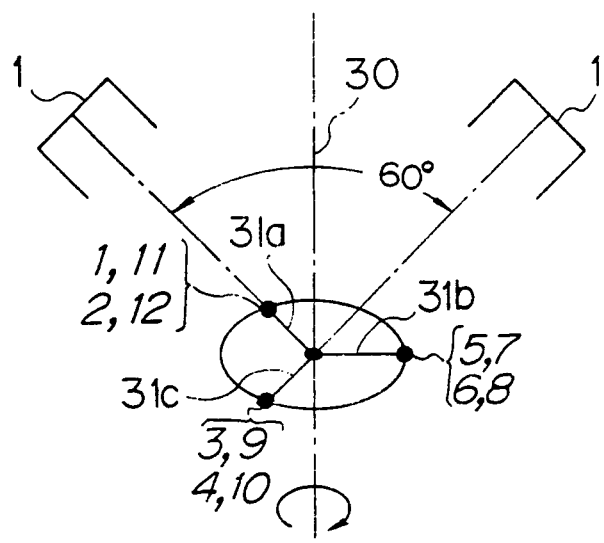
FIG. 11 is a view showing a possible crank shaft arrangement for carrying out the present invention.

FIG. 11 shows generally the phase angle between crank arms connected to a crank shaft. Crank arms 31a, 31b, 31c are connected to a crank shaft 30 with an angular interval of 120°.

Possible sets of crank arm arrangement and firing order so as to obtain the specific effect of this invention are as follows.

(1) Crank arms of cylinders 1, 2, 11, 12 are directed to the direction of arm 31a. Crank arms of cylinders 5, 6, 7, 8 are directed to the direction of arm 31b. Crank arms of cylinders 3, 4, 9, 10 are directed to the direction of arm 31c. Firing order is 1-12-9-4-5-8-11-2-3-10-7-6 or 1-2-9-10-5-6-11-12-3-4-7-8.

(2) Crank arms of cylinders 1, 2, 11, 12 are directed to the direction of arm 31a. Crank arms of cylinders 5, 6, 7, 8 are directed to the direction of arm 31c. Crank arms of cylinders 3, 4, 9, 10 are directed to the direction of arm 31b. Firing order is 1-12-7-6-3-10-11-2-5-8-9-4 or 1-2-7-8-3-4-11-12-5-6-4-10.

We claim:

1. A four cycle, twelve cylinder engine, including six cylinders arranged in a first row and six cylinders arranged in a second row, comprising:
a common crankshaft for said cylinders arranged in said first row and said cylinders arranged in said second row, said cylinders oriented so as to provide a V-shaped cylinder arrangement,
a first cylinder group comprising three cylinders from one end of said first row,
a second cylinder group comprising the remaining three cylinders in said first row,
a third cylinder group comprising three cylinders from one end of said second row,
a fourth cylinder group comprising the remaining three cylinders in said second row,
said cylinders in each cylinder group having intake stroke timings spaced 240° in terms of angle of rotation of said crankshaft,
said cylinders in the first cylinder group having intake stroke timings spaced 120° in terms of angle of rotation of said crankshaft relative to said cylinders in the second cylinder group,
said cylinders in the third cylinder group having intake stroke timings spaced 120° in terms of angle of rotation of said crankshaft relative to said cylinders in the fourth cylinder group,
a first common intake passage means connected, through first branch intake passages, with respective cylinders in said first cylinder group,
a second common intake passage means connected, through second branch intake passages, with respective cylinders in said second cylinder group,
a third common intake passage means connected, through third branch intake passages, with respective cylinders in said third cylinder group, and
a fourth common intake passage means connected, through fourth branch intake passages, with respective cylinders in said fourth cylinder group,
said first common intake passage means and said second common intake passage means being communicated with each other at a first upstream portion thereof, and said third common intake passage means and said fourth common intake passage means being communicated with each other at a second upstream portion thereof, said first and second upstream portions being spaced from each other so that intake resonant supercharging can be achieved in both the first row and the second row of cylinders.

2. A four cycle, twelve cylinder engine in accordance with claim 1, wherein:
a first communicating passage means is provided between said first common intake passage means and said second common intake passage means for communicating said first common intake passage means and said second common intake passage means with each other, a first shut-off valve means being provided in said first communicating passage means, and
a second communicating passage means is provided between said third common intake passage means and said fourth common intake passage means for communicating said third common intake passage means and said fourth common intake passage means with each other, a second shut-off valve means being provided in said second communicating passage means,
so that intake resonant supercharging can be achieved in both the first row and the second row of cylinders under a plurality of engine speeds.

3. A four cycle, twelve cylinder engine, including six cylinders arranged in a first row and six cylinders arranged in a second row, comprising: a common crankshaft for said cylinders arranged in said first row and said cylinders arranged in said second row, said cylinders oriented so as to provide a V-shaped cylinder arrangement, axes of said cylinders arranged in said first row being oriented relative to axes of said cylinders arranged in said second row at a crossing angle of 60°, said cylinders of said first row, respectively, being a No. 1 cylinder, a No. 3 cylinder, a No. 5 cylinder, a No. 7 cylinder, a No. 9 cylinder, and a No. 11 cylinder from one end of said first row, said cylinders of said second row, respectively, being a No. 2 cylinder, a No. 4 cylinder, a No. 6 cylinder, a No. 8 cylinder, a No. 10 cylinder and a No. 12 cylinder from one end of said second row, crank arms of said No. 1, No. 2, No. 11, and No. 12 cylinders being connected to the common crankshaft in a first direction in association with the rotating direction of the common crankshaft, crank arms of said No. 5, No. No. 6, No. 7, and No. 8 cylinders being connected to the common crankshaft in a second direction ahead of the first direction by 120° in association with the rotating direction of the common crankshaft, crank arms of said No. 3, No. 4, No. 9, and No. 10 cylinders being connected to the common crankshaft in a third direction ahead of the first direction by 240° in association with the rotating direction of the common crankshaft, a firing order of said cylinders being 1-12-9-4-5-8-11-2-3-10-7-6, the No. 1, No. 3, and No. 5 cylinders being connected through branch intake passages with a first common intake passage, the No. 7, No. 9, and No. 11 cylinders being connected through branch intake passages with a second common intake passage, the No. 2, No. 4, and No. 6 cylinders being connected through branch intake passages with a third common intake passage, the No. 8, No. 10, and No. 12 cylinders being connected through branch intake passages with a fourth common intake passage, said first, second, third and fourth common intake passages being located above said cylinders in said first row and said second row, said first and second common intake passages being communicated with each other at a first upstream portion thereof, and said third and fourth common intake passages being communicated with each other at a second upstream portion thereof, said first and second upstream portions being spaced from each other.

4. A four cycle, twelve cylinder engine, including six cylinders arranged in a first row and six cylinders arranged in a second row, comprising: a common crankshaft for said cylinders arranged in said first row and said cylinders arranged in said second row, said cylinders oriented so as to provide a V-shaped cylinder arrangement, axes of said cylinders arranged in said first row being oriented relative to axes of said cylinders arranged in said second row at a crossing angle of 60°, said cylinders of said first row respectively being a No. 1 cylinder, a No. 3 cylinder, a No. 5 cylinder, a No. 7 cylinder, a No. 9 cylinder and a No. 11 cylinder from one end of said first row, said cylinders of said second row, respectively, being a No. 2 cylinder, a No. 4 cylinder, a No. 6 cylinder, a No. 8 cylinder, a No. 10 cylinder, and a No. 12 cylinder from one end of said second row, crank arms of said No. 1, No. 2, No. 11, and No. 12 cylinders being connected to the common crankshaft in a first direction in association with the rotating direction of the common crankshaft, crank arms of said No. 5, No. 6, No. 7, and No. 8 cylinders being connected to the common crankshaft in a second direction ahead of the first direction by 120° in association with the rotating direction of the common crankshaft, crank arms of said No. 3, No. 4, No. 9, and No. 10 cylinders being connected to the common crankshaft in a third direction ahead of the first direction by 240° in association with the rotating direction of the common crankshaft, a firing order of said cylinders being 1-2-9-10-5-6-11-12-3-4-7-8, the No. 1, No. 3, and No. 5 cylinders being connected through branch intake passages with a first common intake passage, the No. 7, No. 9, and No. 11 cylinders being connected through branch intake passages with a second common intake passage, the No. 2, No. 4, and No. 6 cylinders being connected through branch intake passages with a third common intake passage, the No. 8, No. 10, and No. 12 cylinders being connected through branch intake passages with a fourth common intake passage, said first, second, third and fourth common intake passages being located above said cylinders in said first row and said second row, said first and second common intake passages being communicated with each other at a first upstream portion thereof, and said third and fourth common intake passages being communicated with each other at a second upstream portion thereof, said first and second upstream portions being spaced from each other.

5. A four cycle, twelve cylinder engine, including six cylinders arranged in a first row and six cylinders arranged in a second row, comprising: a common crankshaft for said cylinders arranged in said first row and said cylinders arranged in said second row, said cylinders oriented so as to provide a V-shaped cylinder arrangement, axes of said cylinders arranged in said first row being oriented relative to axes of said cylinders arranged in said second row at a crossing angle of 60°, said cylinders of said first row respectively being a No. 1 cylinder, a No. 3 cylinder, a No. 5 cylinder, a No. 7 cylinder, a No. 9 cylinder and a No. 11 cylinder from one end of said first row, said cylinders of said second row respectively being a No. 2 cylinder, a No. 4 cylinder, a No. 6 cylinder, a No. 8 cylinder, a No. 10 cylinder and a No. 12 cylinder from one end of said second row, crank arms of said No. 1, No. 2, No. 11, and No. 12 cylinders being connected to the common crankshaft in a first direction in association with the rotating direction of the common crankshaft, crank arms of said No. 3, No. 4, No. 9, and No. 10 cylinders being connected to the common crankshaft in a second direction ahead of the first direction by 120° in association with the rotating direction of the common crankshaft, crank arms of said No. 5, No. 6, No. 7, and No. 8 cylinders being connected to the common crankshaft in a third direction ahead of the first direction by 240° in association with the rotating direction of the common crankshaft, a firing order of said cylinders being 1-12-7-6-3-10-11-2-5-8-9-4, the No. 1, No. 3, and No. 5 cylinders being connected through branch intake passages with a first common intake passage, the No. 7, No. 9, and No. 11 cylinders being connected through branch intake passages with a second common intake passage, the No. 2, No. 4, and No. 6 cylinders being connected through branch intake passages with a third common intake passage, the No. 8, No. 10, and No. 12 cylinders being connected through branch intake passages with a fourth common intake passage, said first, second, third and fourth common intake passages being located above said cylinders in said first row and said second row, said first and second common intake passages being communicated with each other at a first upstream portion thereof, and said third and fourth common intake passages being communicated with each other at a second upstream portion thereof, said first and second upstream portions being spaced from each other.

6. A four cycle, twelve cylinder engine, including six cylinders arranged in a first row and six cylinders arranged in a second row, comprising: a common crankshaft for said cylinders arranged in said first row and said cylinders arranged in said second row, said cylinders oriented so as to provide a V-shaped cylinder arrangement, axes of said cylinders arranged in said first row being oriented relative to axes of said cylinders arranged in said second row at a crossing angle of 60°, said cylinders of said first row respectively being a No. 1 cylinder, a No. 3 cylinder, a No. 5 cylinder, a No. 7 cylinder, a No. 9 cylinder and a No. 11 cylinder from one end of said first row, said cylinders of said second row respectively being a No. 2 cylinder, a No. 4 cylinder, a No. 6 cylinder, a No. 8 cylinder, a No. 10 cylinder and a No. 12 cylinder from one end of said second cylinder row, crank arms of said No. 1, No. 2, No. 11, and No. 12 cylinders being connected to the common crankshaft in a first direction in association with the rotating direction of the common crankshaft, crank arms of said No. 3, No. 4, No. 9, and No. 10 cylinders being connected to the common crankshaft in a second direction ahead of the first direction by 120° in association with the rotating direction of the common crankshaft, crank arms of said No. 5, No. 6, No. 7, and No. 8 cylinders being connected to the common crankshaft in a third direction ahead of the first direction by 240° in association with the rotating direction of the common crankshaft, a firing order of said cylinders being 1-2-7-8-3-4-11-12-5-6-4-10, the No. 1, No. 3, and No. 5 cylinders being connected through branch intake passages with a first common intake passage, the No. 7, No. 9, and No. 11 cylinders being connected through branch intake passages with a second common intake passage, the No. 2, No. 4, and No. 6 cylinders being connected through branch intake passages with a third common intake passage, the No. 8, No. 10, and No. 12 cylinders being connected through branch intake passages with a fourth common intake passage, said first, second, third and fourth common intake passages being located above said cylinders in said first row and said second row, said first and second common intake passages being communicated with each other at a first upstream portion thereof, and said third and fourth common intake passages being communicated with each other at a second upstream portion thereof, said first and second upstream portions being spaced from each other.

7. A four cycle, twelve cylinder engine in accordance with claim 3, wherein:
   a first communicating passage is provided between said first and second common intake passages for communicating said first and second common intake passages with each other, a first shut-off valve being provided in said first communicating passage; and
   a second communicating passage is provided between said third and fourth common intake passages for communicating said third and fourth common intake passages with each other, a second shut-off valve being provided in said second communicating passage.

8. A four cycle, twelve cylinder engine in accordance with claim 4, wherein:
   a first communicating passage is provided between said first and second common intake passages for communicating said first and second common intake passages with each other, a first shut-off valve being provided in said first communicating passage; and
   a second communicating passage is provided between said third and fourth common intake passages for communicating said third and fourth common intake passages with each other, a second shut-off valve being provided in said second communicating passage.

9. A four cycle, twelve cylinder engine in accordance with claim 5, wherein:
   a first communicating passage is provided between said first and second common intake passages for communicating said first and second common intake passages with each other, a first shut-off valve being provided in said first communicating passage; and
   a second communicating passage is provided between said third and fourth common intake passages for communicating said third and fourth common intake passages with each other, a second shut-off valve being provided in said second communicating passage.

10. A four cycle, twelve cylinder engine in accordance with claim 6, wherein:
    a first communicating passage is provided between said first and second common intake passages for communicating said first and second common intake passages with each other, a first shut-off valve being provided in said first communicating passage; and
    a second communicating passage is provided between said third and fourth common intake passages for communicating said third and fourth common intake passages with each other, a second shut-off valve being provided in said second communicating passage.

* * * * *